US011956115B2

United States Patent
Roh et al.

(10) Patent No.: US 11,956,115 B2
(45) Date of Patent: Apr. 9, 2024

(54) DISTRIBUTED CONTROL SYSTEM FOR LARGE SCALE GEOGRAPHICALLY DISTRIBUTED DATA CENTERS AND METHODS FOR USE THEREWITH

(71) Applicant: MetalSoft Cloud, Inc., Chicago, IL (US)

(72) Inventors: Lucas Joon Roh, Chicago, IL (US); Alex Bordei, Dobroesti (RO)

(73) Assignee: MetalSoft Cloud, Inc., Chicago, IL (US)

( * ) Notice: Subject to any disclaimer, the term of this patent is extended or adjusted under 35 U.S.C. 154(b) by 0 days.

(21) Appl. No.: 18/060,381

(22) Filed: Nov. 30, 2022

(65) Prior Publication Data

US 2023/0188406 A1    Jun. 15, 2023

Related U.S. Application Data

(60) Provisional application No. 63/265,174, filed on Dec. 9, 2021.

(51) Int. Cl.
*H04L 41/046* (2022.01)
*H04L 41/0816* (2022.01)
*H04L 41/5054* (2022.01)

(52) U.S. Cl.
CPC ........ *H04L 41/046* (2013.01); *H04L 41/0816* (2013.01); *H04L 41/5054* (2013.01)

(58) Field of Classification Search
CPC ............... H04L 41/046; H04L 41/0816; H04L 41/5054; H04L 41/044; H04L 41/0806
See application file for complete search history.

(56) References Cited

U.S. PATENT DOCUMENTS

| | | | | |
|---|---|---|---|---|
| 2012/0117226 A1* | 5/2012 | Tanaka | ................ | H04L 41/5041 709/224 |
| 2012/0266168 A1* | 10/2012 | Spivak | .................... | H04L 67/10 718/1 |
| 2017/0141962 A1* | 5/2017 | Britt | ...................... | G06F 9/5072 |
| 2019/0116110 A1* | 4/2019 | Raney | ...................... | G06F 8/60 |
| 2020/0295998 A1* | 9/2020 | Ranjbar | .................. | H04L 41/40 |
| 2023/0053575 A1* | 2/2023 | Marche | ................ | G06F 9/5027 |

* cited by examiner

*Primary Examiner* — Joe Chacko
(74) *Attorney, Agent, or Firm* — Garlick & Markison; Bruce E. Stuckman

(57) ABSTRACT

A system includes a plurality of agents to control managed equipment of a geographically distributed data center. A controller communicates management data with the plurality of agents via a management network. The controller and the plurality of agents are configured in a hierarchical topology. A first subset of the plurality of agents relay management data on behalf of a second subset of the plurality of agents. The controller is further configured to: communicate with a new agent to be provisioned into the plurality of agents; generate reconfiguration instructions that indicate an allocated parent agent of the plurality of agents to be associated with the new agent; and facilitate a provisioning of the new agent in accordance with the reconfiguration instructions, to connect the new agent to the allocated parent agent of the plurality of agents via the management network and disconnect the new agent from the controller.

Figure 1:
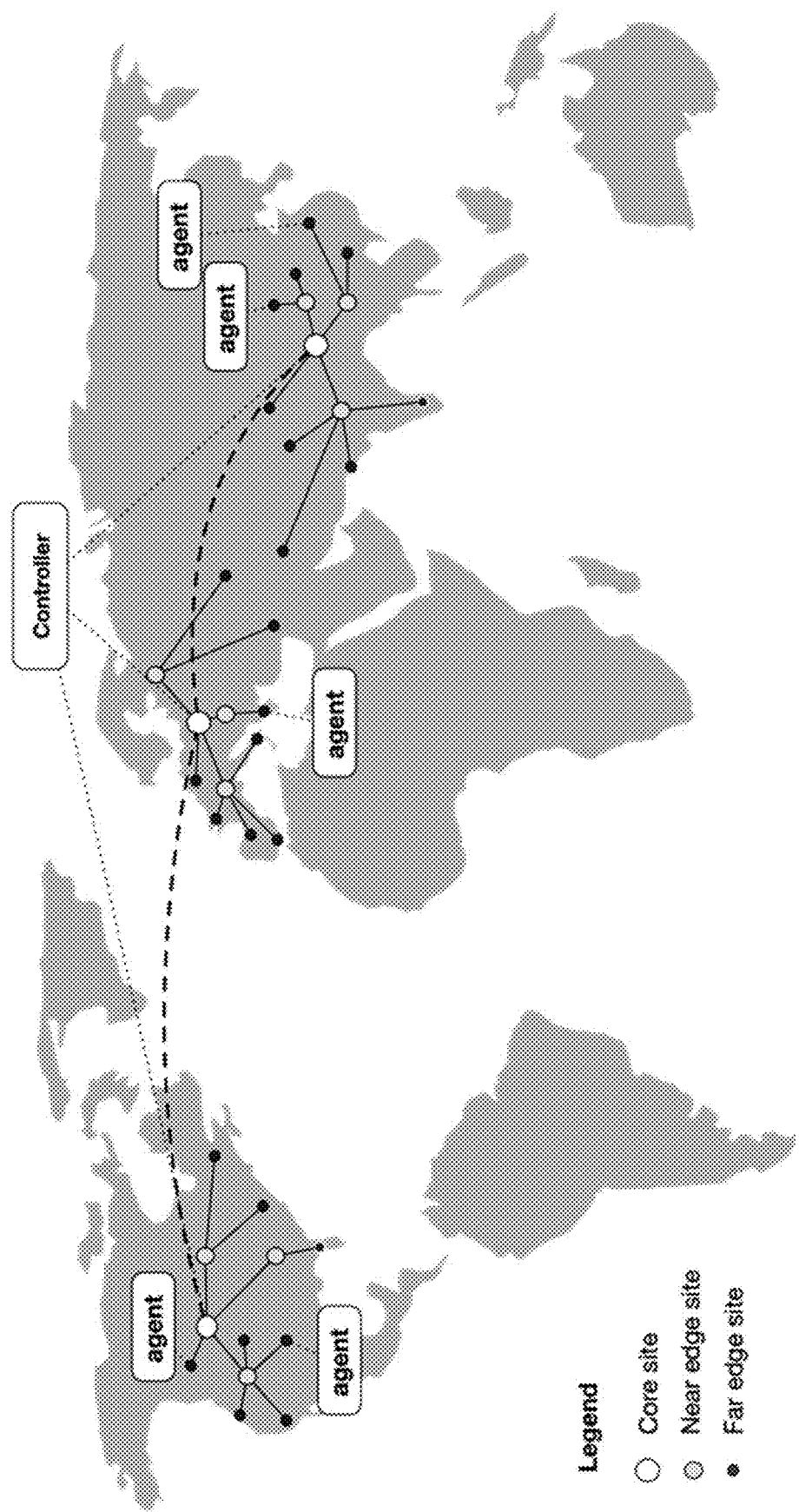

18 Claims, 9 Drawing Sheets

# DISTRIBUTED CONTROL SYSTEM FOR LARGE SCALE GEOGRAPHICALLY DISTRIBUTED DATA CENTERS AND METHODS FOR USE THEREWITH

BACKGROUND

Technical Field

This disclosure relates generally to geographically distributed data centers and control systems and methods for use therewith.

BRIEF DESCRIPTION OF THE SEVERAL VIEWS OF THE DRAWING(S)

FIG. 1 presents a schematic block diagram representation of an example of a control system for a geographically distributed data center.

Figure 2A:
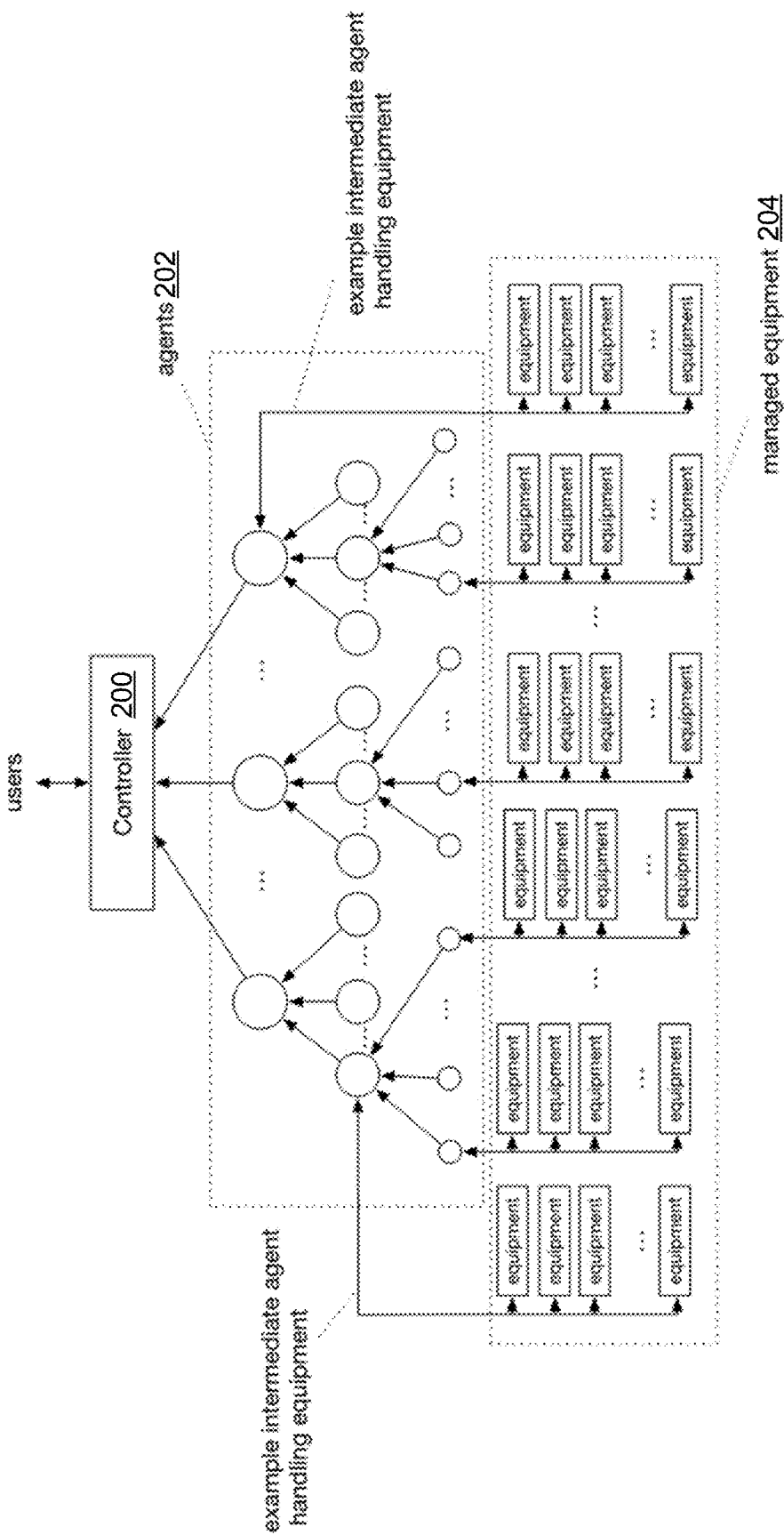

FIG. 2A presents a schematic block diagram representation of an example of a control system for a geographically distributed data center.

Figure 2B:
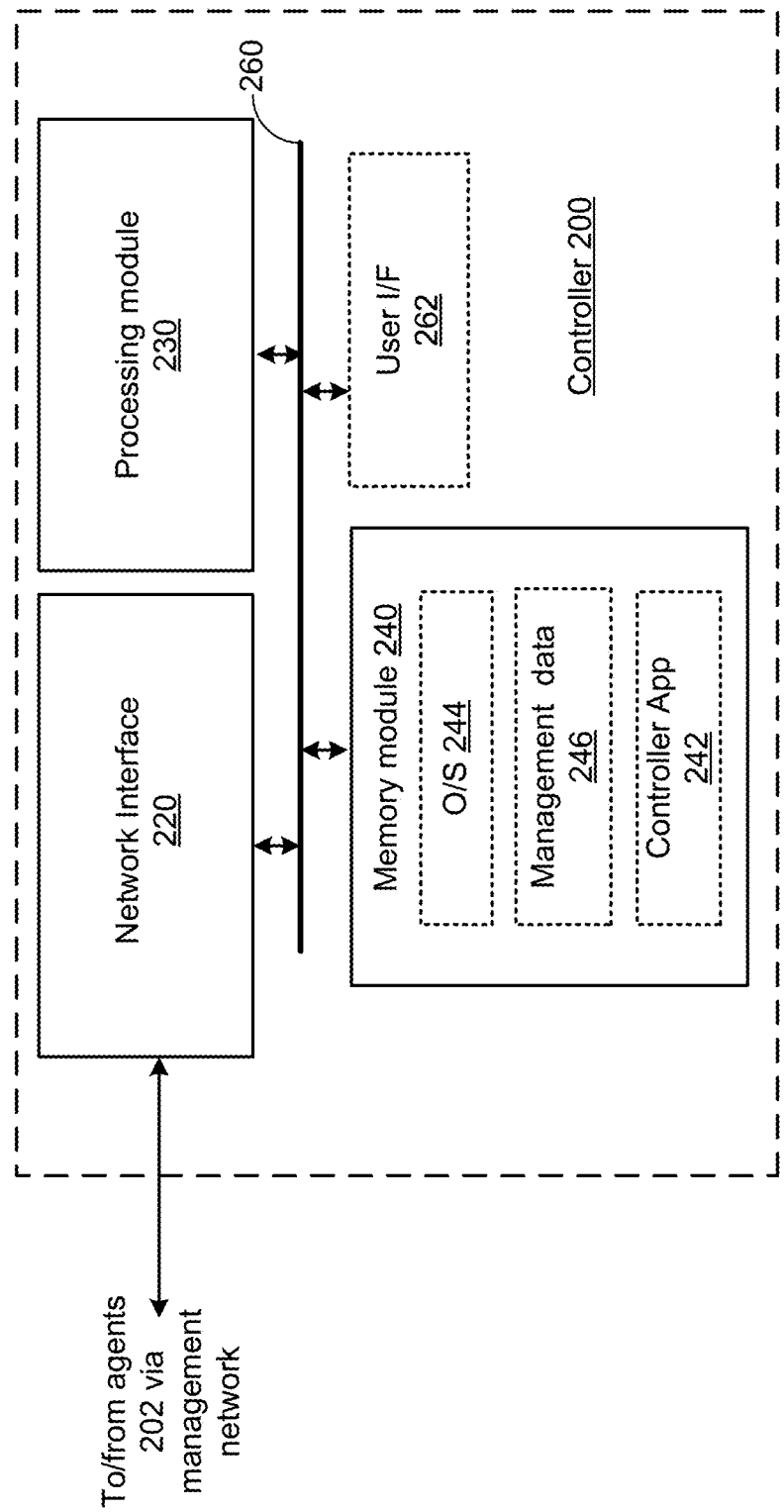

FIG. 2B presents a schematic block diagram representation of an example of a controller.

Figure 2C:
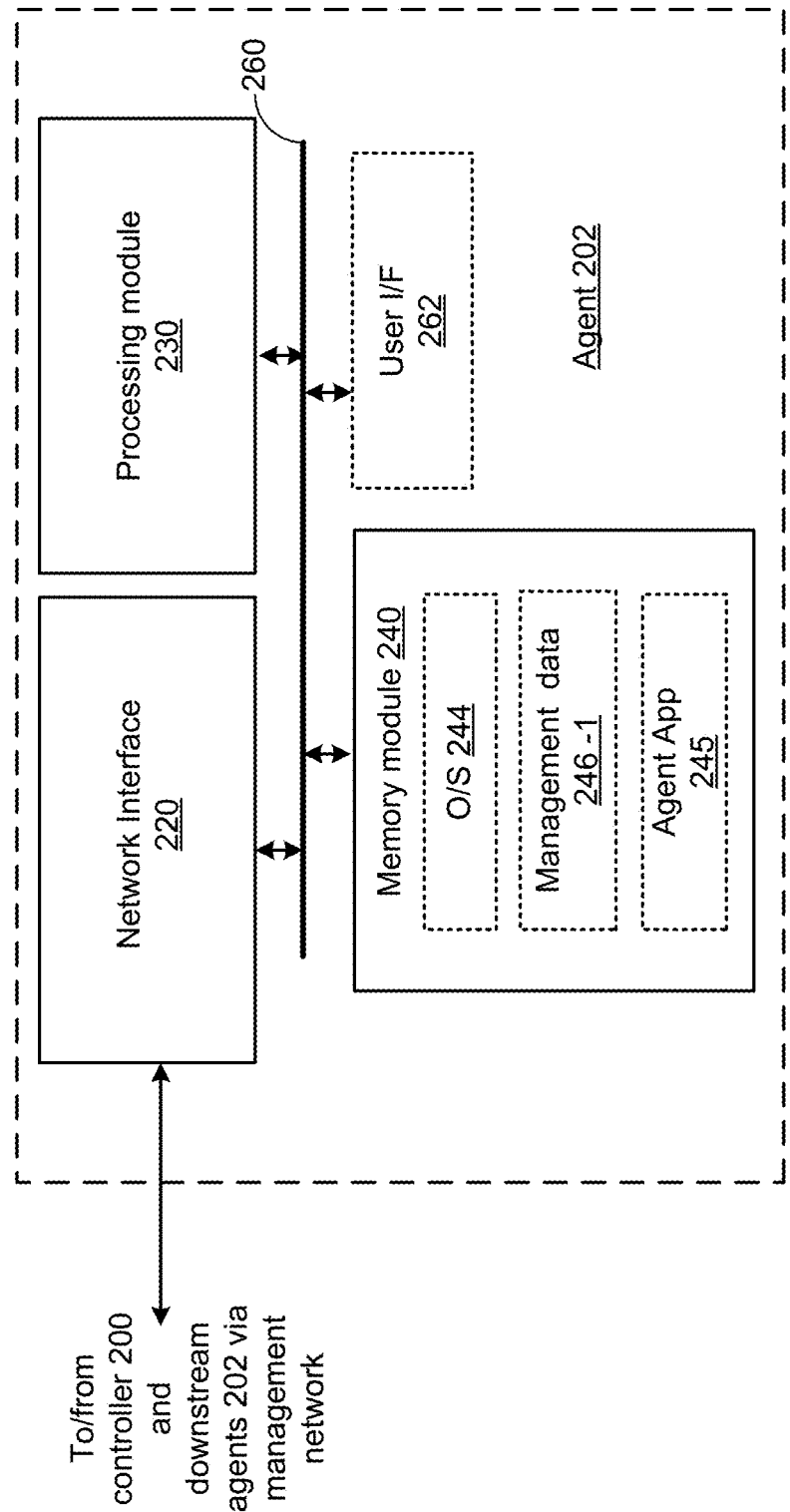
Figure 3:
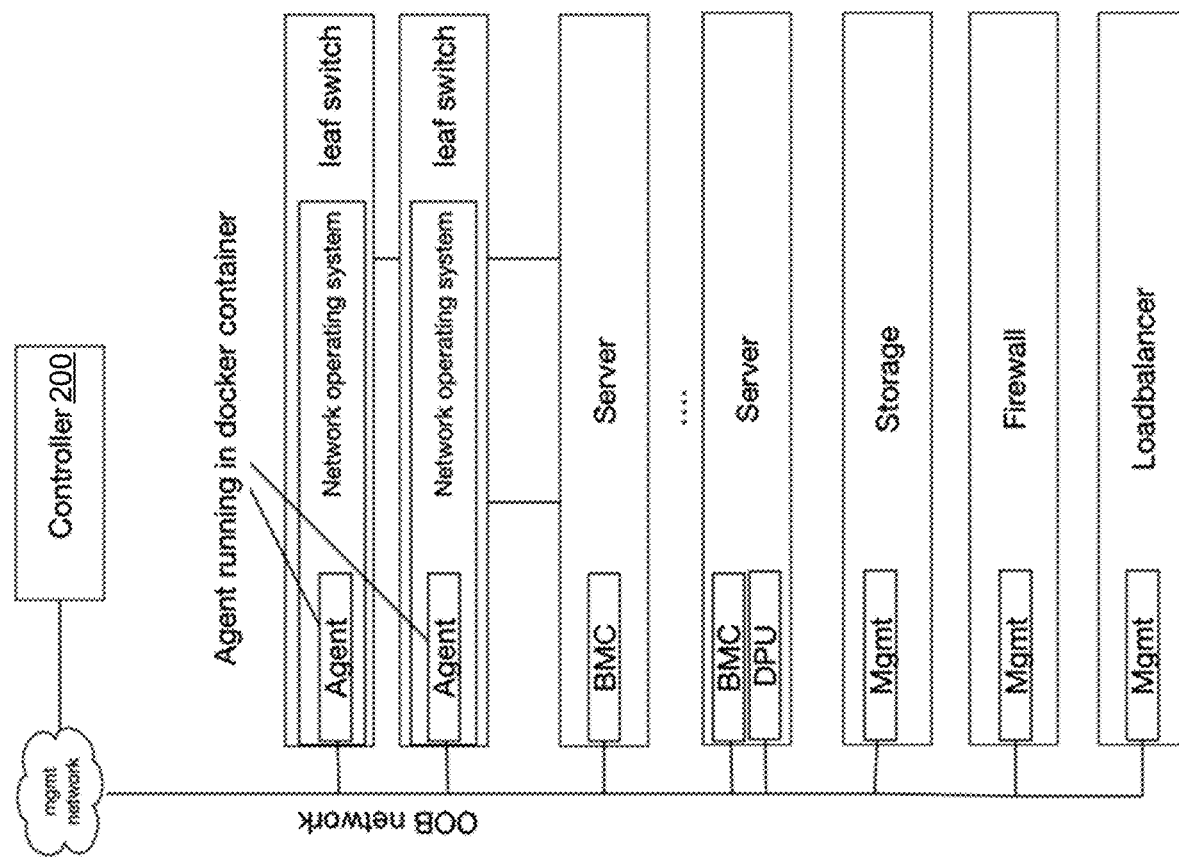

FIG. 2C presents a schematic block diagram representation of an example of an agent.

FIGS. 3-6 present schematic block diagram representations of examples of a control system for a geographically distributed data center.

Figure 7:
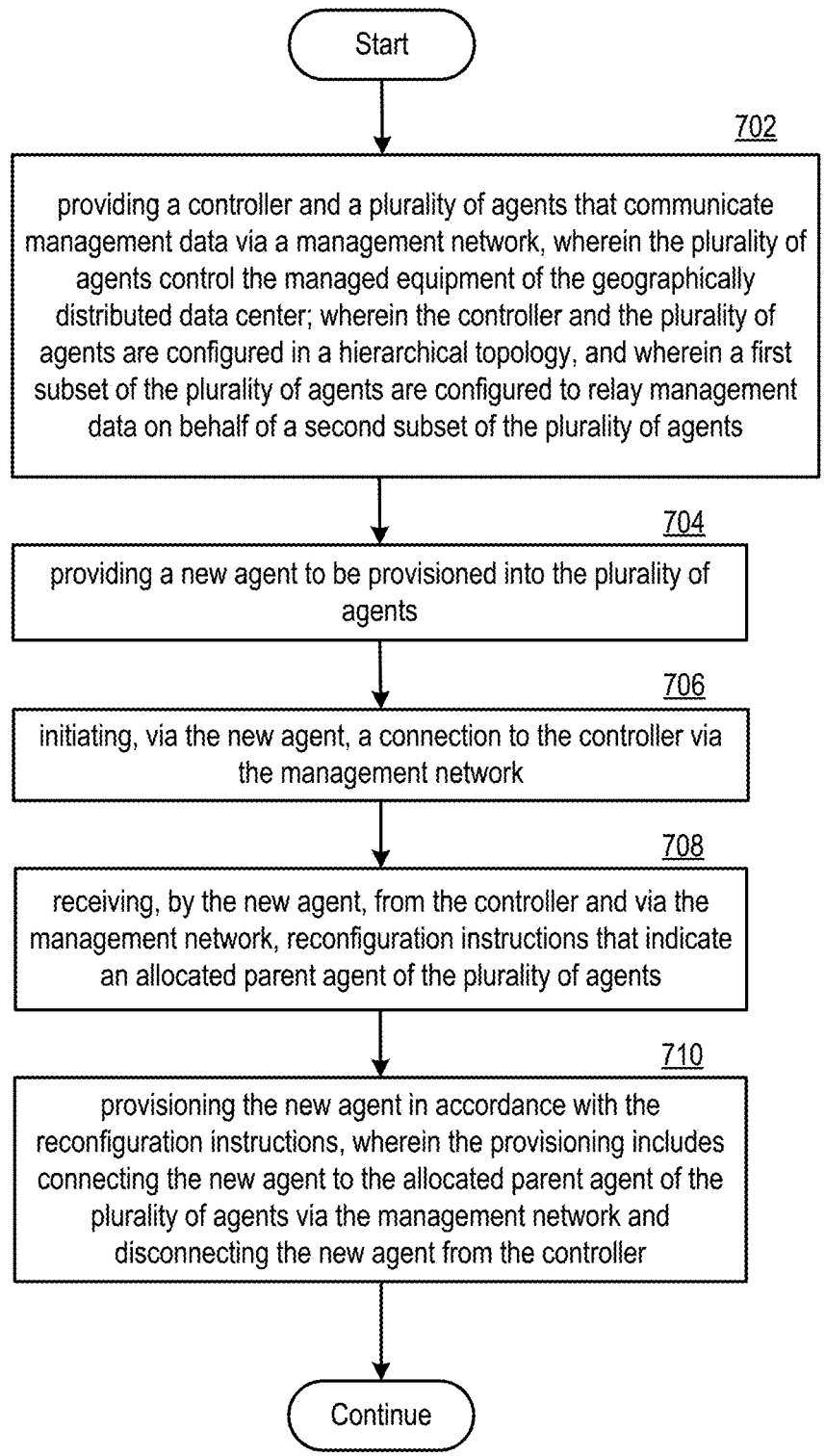

FIG. 7 presents a flow diagram representation of an example of an example method.

DETAILED DESCRIPTION

FIG. 1 presents a schematic block diagram representation of an example of a control system for a geographically distributed data center. Remote control of IT equipment is a common task of modern data centers. Frequently, the same company operates multiple data centers that may be geographically distributed. Managing the lifecycle of the equipment (deployment, configuration, cleaning) by being physically in proximity of the equipment may not be practical due to the location or cost. Current methods for such management are either monolithic or use a single-level wheel-and-spoke setup whereby agents (when present) connect to a single central location. For large-scale deployments with potentially hundreds of thousands of small, "edge" data centers and millions of servers, controller need to potentially support a large number of concurrent connections from all the agents, which is impractical. At the same time, modern data center equipment generates thousands of data points per second and gathering all those data from potentially millions of servers from a central location creates a single "choke" point, potentially overwhelming the network and the computing equipment tasked with analyzing the data.

A remote control method is presented that for datacenter equipment management that uses a network (or management network) of highly autonomous "agent nodes" or "agents" that connect to each other and directly or indirectly to a central controller (or controller) in the form of a graph. In the example shown, a geographically distributed data center is managed by the controller via a hierarchical network of agents. Such management includes provisioning, monitoring and otherwise controlling the operation of the agents as well as managed equipment, such as computing and storage resources, attached thereto.

This configuration facilitates the control, provisioning and monitoring of the physical computing, storage and network infrastructure (e.g. bare metal) underpinning a modern edge cloud and hyper-scale type datacenter deployment. This configuration facilitates the remote control of a large number (e.g., millions or more) of devices spread across a large number (e.g. hundreds of thousands or more) of locations from a central control location while also supporting a degree of autonomous operation in the event of connectivity failure of a subset of devices.

This configuration improves the technology of data center management via the minimization of control and monitoring traffic across the network and by keeping the data at the "edge". In particular, aggregation operations, such as counting the errors across all of the equipment of several devices within a region, are performed by the agents using distributed processing approaches such as map-reduce.

Further details including example implementations, several optional functions and features, are described in conjunction with the Figures that follow.

FIG. 2A presents a schematic block diagram representation of an example of a control system for a geographically distributed data center. A distributed control system is shown consisting of a plurality of computer programs called "Agents 202" and a single computer program called a "Controller 200". The agents 202 are connected directly or indirectly to the controller 200 forming a management network that is operable to receive instructions and execute tasks on behalf of controller 200 with the purpose of provisioning, automatic healing, monitoring and facilitating the analysis of the monitoring/management data. All agents 202 can route management/control traffic to/from other agents 202. In addition, any or all of the agents 202 can manage equipment, such as managed equipment 204. In various examples, the agents 202 use vendor-specific protocols such as Redfish and/or other APIs or protocols, to configure, re-configure and monitor the managed equipment 204.

Consider the following example. The plurality of agents 202 are configured to control the managed equipment 204 of the geographically distributed data center. The controller 200 is configured to communicate management data with the plurality of agents 202 via a management network, wherein the controller 200 and the plurality of agents 202 are configured in a hierarchical topology, and wherein a first subset of the plurality of agents 202 are configured to relay management data on behalf of a second subset of agents of the plurality of agents 202, and wherein the controller is further configured to:

communicate, via the management network, with a new agent to be provisioned into the plurality of agents;

generate reconfiguration instructions that indicate an allocated parent agent of the plurality of agents to be associated with the new agent; and facilitate a provisioning the new agent in accordance with the reconfiguration instructions, wherein the facilitating the provisioning includes connecting the new agent to the allocated parent agent of the plurality of agents via the management network and disconnecting the new agent from the controller.

In various examples, the controller communicates directly via the management network with the first subset of the plurality of agents, wherein the controller communicates indirectly via the management network with the second subset of the plurality of agents, and wherein the controller communicates indirectly via the management network with the second subset of the plurality of agents via ones of the first subset of the plurality of agents.

In various examples, at least one of the plurality of agents is configured to communicate directly with another agent of the plurality of agents to perform a coordinated distributed processing. The coordinated distributed processing can include a map-reduce function to produce aggregated data and wherein the at least one of the plurality of agents communicates the aggregated data to the controller.

In various examples, at least one of the plurality of agents is configured to perform a plurality of functions autonomously from the controller, wherein the plurality of functions include two or more of: initiating a connection to an upstream agent of the plurality of agents in the hierarchical topology, pulling state information from the upstream agent of the plurality of agents, attempting a reconnection with another agent of the plurality of agents, or auto-healing degraded portions of the management network under jurisdiction of the at least one of the plurality of agents.

In various examples, at least one of the plurality of agents are configured to perform a plurality of functions autonomously from the controller, wherein the plurality of functions include two or more of: initiating a connection to an upstream agent of the plurality of agents in the hierarchical topology, receiving tasks to be performed from the upstream agent of the plurality of agents, or receiving a notification that a state of the management network has changed.

In various examples, the controller determines the allocated parent agent for the new agent based on at least one of: a geographical proximity to the new agent the allocated parent agent or based on a latency triangulation between the new agent and the allocated parent agent.

In various examples, when a child agent of the second subset of agents is disconnected from its designed parent agent included in the first subset of agents, the child agent is configured to:
  retry connection with its designated parent agent for a configurable amount of time; and
  when child agent fails to connect with its designated parent agent during the configurable amount of time, the child agent attempts reconnection with the controller.

FIG. 2B presents a schematic block diagram representation of an example of a controller. In particular, a controller 200 is presented that includes a network interface 220 such as a 3G, 4G, 5G or other cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating for communicating with agents 202 via a management network.

The controller 200 also includes a processing module 230 and memory module 240 that stores an operating system (O/S) 244 such as an Apple, Unix, Linux or Microsoft operating system or other operating system, management data 246 associated with the agents 202, the managed equipment 204, and/or a controller application 242—e.g., any of the monitoring data, control data and/or other data communicated via the management network. In particular, the O/S 244 and controller application 242 each include operational instructions that, when executed by the processing module 230, cooperate to configure the processing module into a special purpose device to perform the particular functions of the controller 200 described herein.

The controller 200 also includes a user interface (I/F) 262 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to a user of the controller 200 (e.g. a network manager or administrator) and that generate data in response to the user's interaction with the controller 200.

The processing module 230 can be implemented via a single processing device or a plurality of processing devices. Such processing devices can include a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on operational instructions that are stored in a memory, such as memory 240. The memory module 240 can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 260, other architectures are possible including additional data buses and/or direct connectivity between one or more elements. Further, controller 200 can include one or more additional elements that are not specifically shown.

FIG. 2C presents a schematic block diagram representation of an example of an agent. In particular an agent 202 is presented that includes several similar components to controller 200 that are referred to by common reference numerals. In particular, the agent 202 operates via a shared or dedicated processing module 230 and memory module 240 that stores an agent application 245 and an operating system (O/S) 244 such as an Apple, Unix, Linux or Microsoft operating system or other operating system, management data 246-1 associated with itself and/or other agents 202, and the managed equipment 204. In various examples, the agent 202, via the agent application 245 run in conjunction with a network operating system on a leaf switch or other network element. The O/S 244 and agent application 245 each include operational instructions that, when executed by the processing module 230, cooperate to configure the processing module into a special purpose device to perform the particular functions of the controller 200 described herein. It should be noted that the user interface 262 may or may not be included.

FIGS. 3-6 present schematic block diagram representations of examples of a control system for a geographically distributed data center. Turning to the example of FIG. 3, the agent runs inside the operating system of the top-of-rack switch. In other examples, the agent could run on a server's DPU or a dedicated server.

Various examples of operation include a controlling method for large scale bare metal provisioning where a series of agents that control the servers, switches, storage units and other equipment as well as operating systems and applications. The agents form a management network with the controller 200 wherein agents are able to relay tasks and data on behalf of other agents. Furthermore:

- The agents can have a high degree of autonomy such as initiating the connections to the upstream connection points, pulling state information, attempting reconnects or auto-healing degraded portions of the network under their jurisdiction without requiring an active connection to a central coordination hub.
- The agents can be modular and allow various components to be enabled or disabled in order to allow the execution within a resource constricted environment such as a network switch's operating system or a high resource location such as a server.
- The agents can communicate bi-directionally with a regional coordinator (e.g. another agent that is higher in the hierarchy), receiving notifications that the state has changed or tasks to be performed via the connection initiated and maintained by the agent.
- The agents can communicate directly with another agent in order to perform coordinated distributed processing such as map-reduce in order to provide aggregated data to the controller.

Figure 4:
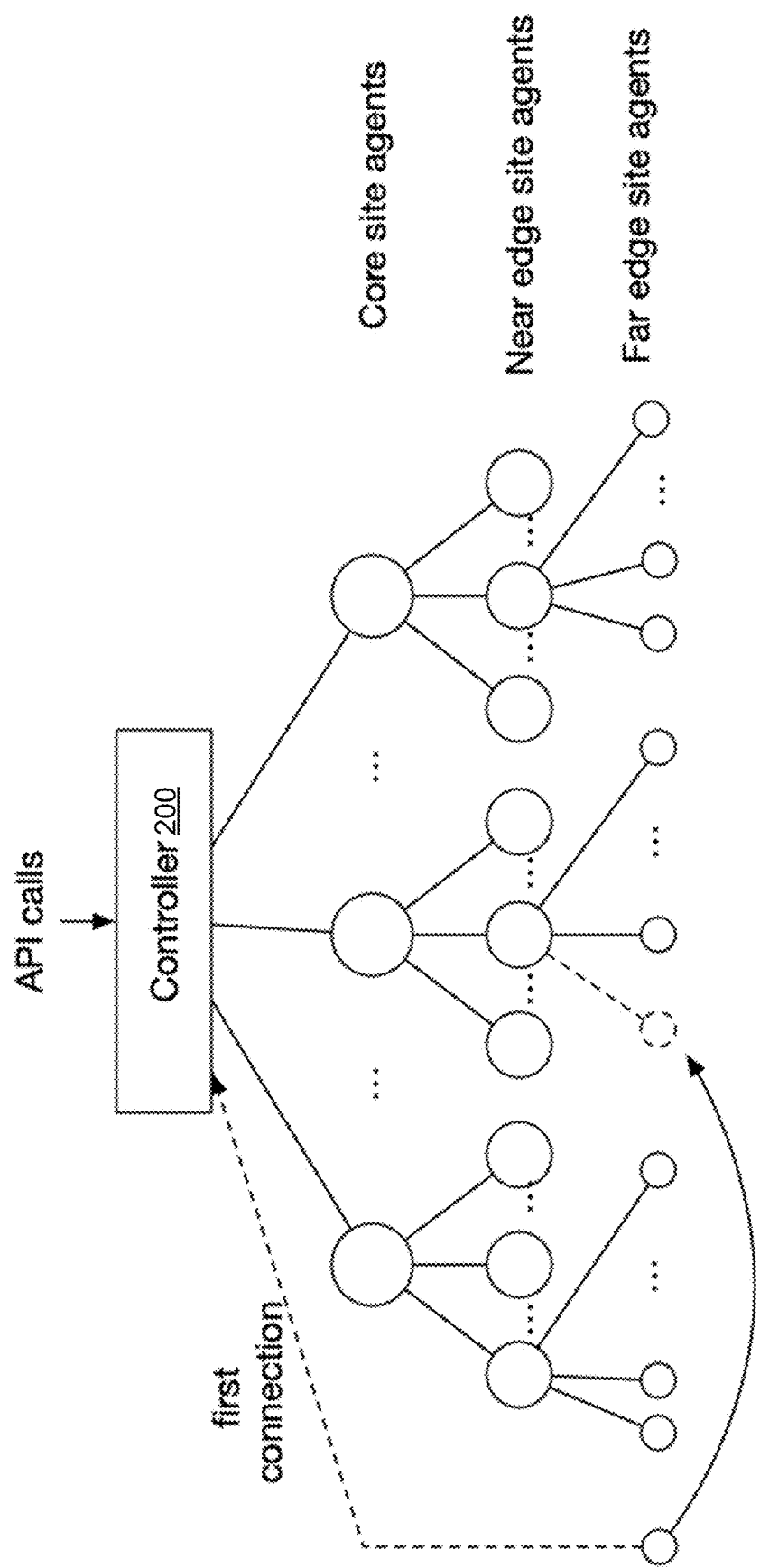

Turning to FIG. 4, a process for adding a new agent is shown. In this case, the control plane network composed of a tree of agents and a controller 200 that communicate over a pre-existing IP network. Agents initiate and maintain a persistent web socket-based connection to the upstream nodes on which they receive instructions or requests for monitoring data and are able to push events such as a disk failure to the controller 200. When powered on, agents initiate connections to the controller 200. The controller 200 then determines the appropriate parent agent to send reconfiguration instructions to the new agents. The agent will then disconnect from the controller and connect to the allocated parent agent. The controller can use a configurable mechanism for determining the appropriate parent node for a given agent such as but not limited to:

- Geographic proximity. An operator can input the LAT, LONG and address coordinates manually for each new site.
- Latency triangulation. The agent gets a series of randomly distributed pre-existing agents from the controller and measures the network latency to each of them. It then gets another set of agents within a latency radius and measures the latency towards them and repeats the above algorithm. The agent to be picked as parent will be the one for which the above algorithm is stable for at least 3 cycles.

Figure 5:
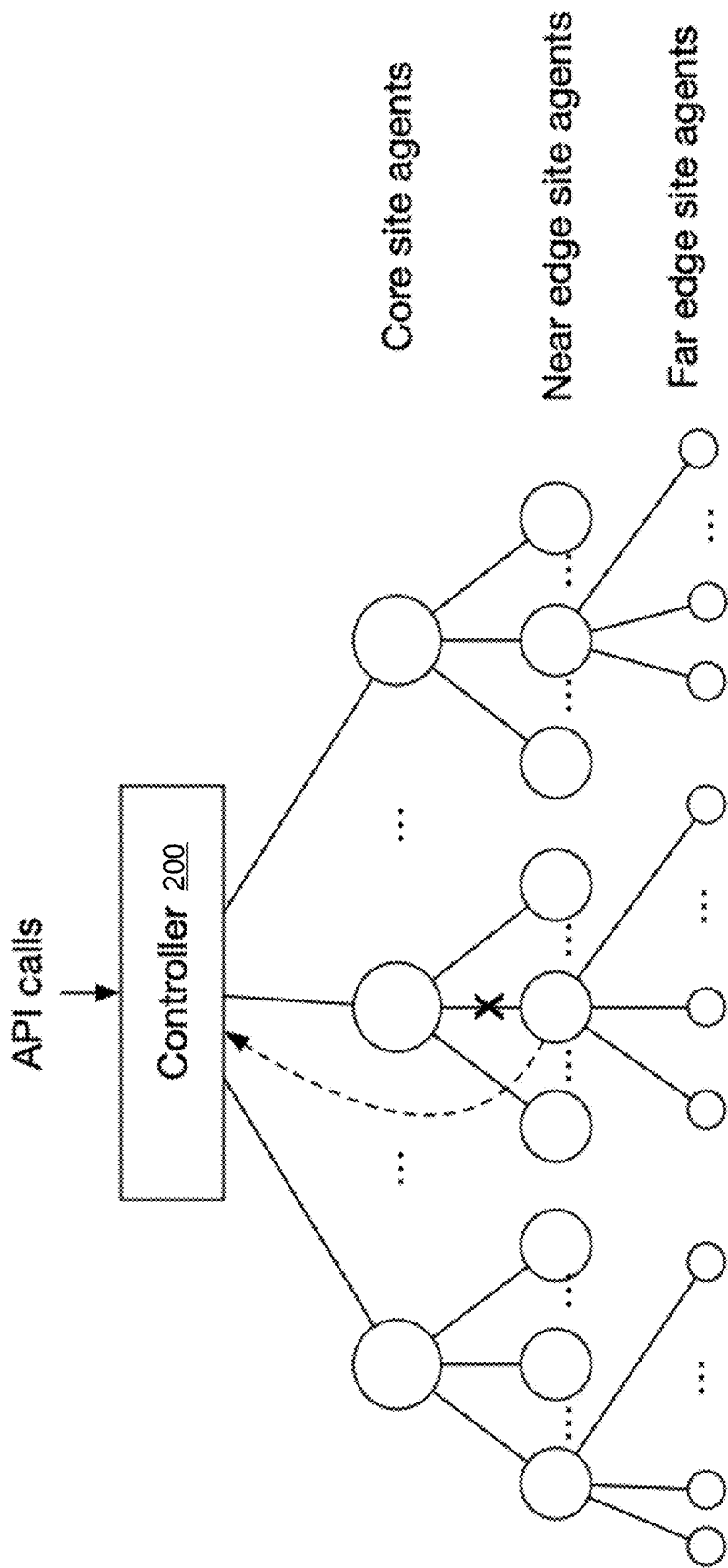

Turning to FIG. 5, a process for operating agents during steady state is shown. Once connected to their "parent nodes" the agents will maintain the web socket connection open at all times. The parent nodes will relay commands and data to-and-from the controller to the leaf nodes. Parent nodes also have operational responsibilities on their own. Every node can also act as a relay for other nodes.

If an agent is disconnected without warning from the parent node, it will continue to retry the connection towards the parent agent a configurable number of minutes. When this timer has expired the agent will try a reconnect to the controller 200. If that also fails, the agent will continue to cycle trying to connect to the parent node and the controller 200 indefinitely. During this time monitoring data (e.g. management data 246-1) continues to be accumulated locally in the downstream agent nodes as usual. This ensures data collection which is essential for security and troubleshooting later on.

Figure 6:
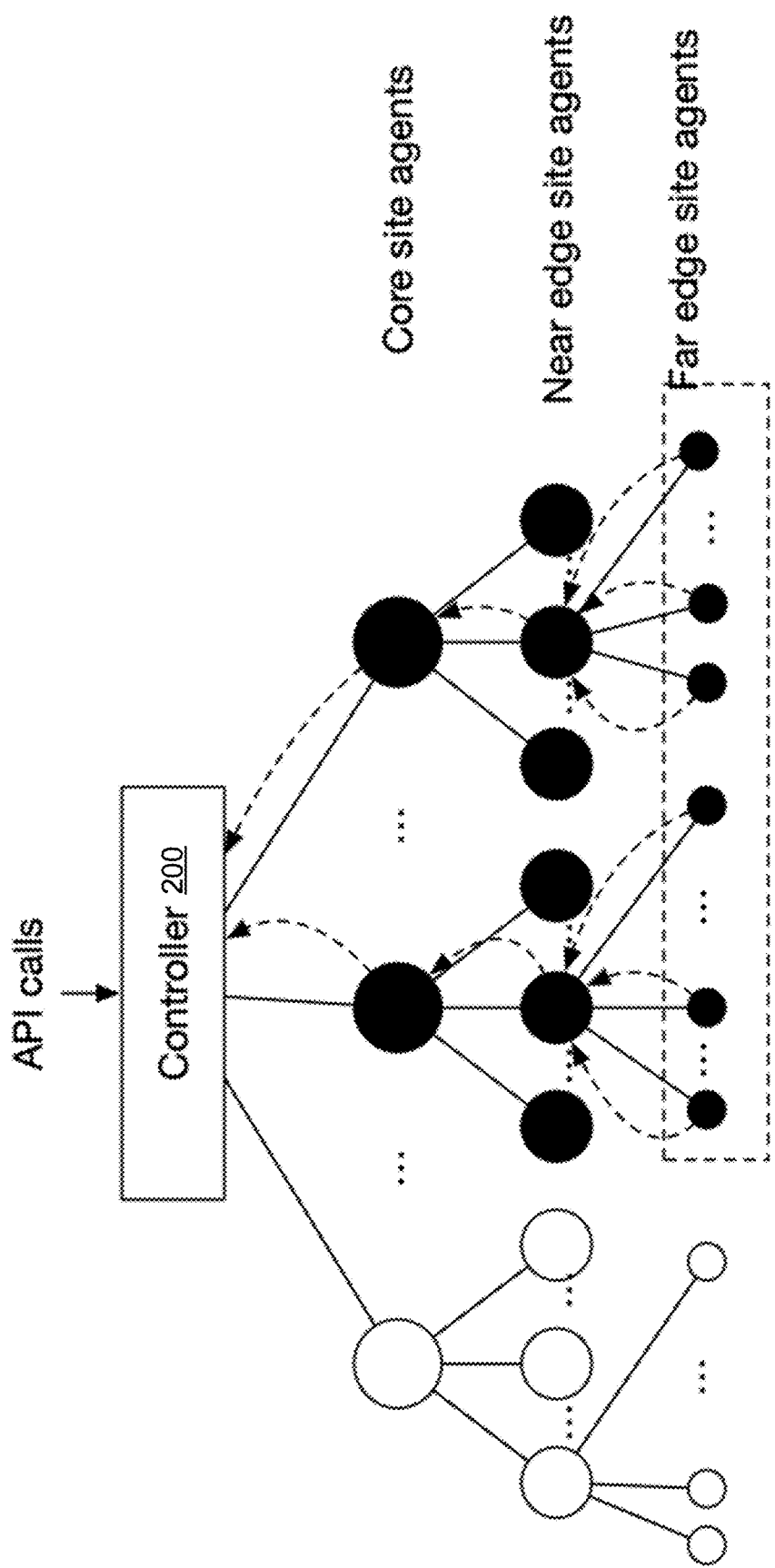

Turning to FIG. 6, a process for data aggregation is shown. Agents also operate light processing work in order to aggregate monitoring and log data from the downstream nodes before it is sent to upstream nodes in order to offload the controller 200 from having to receive and process all the data from the nodes. Techniques like map-reduce or other techniques can be used to distribute the work across the nodes.

Agents performing data aggregation locally in order to respond for a request for an aggregated data (such as the sum of packet forwarding errors) across the highlighted region. The data is processed using sequences of map-reduce by the "near edge sites" and the "core sites" and then finally by the controller 200.

FIG. 7 presents a flow diagram representation 700 of an example of an example method. In particular, a method is presented for use with one or more of the functions and features described in conjunction with any of the other Figures presented herein. Step 702 includes providing a controller and a plurality of agents that communicate management data via a management network, wherein the plurality of agents control the managed equipment of the geographically distributed data center; wherein the controller and the plurality of agents are configured in a hierarchical topology, and wherein a first subset of the plurality of agents are configured to relay management data on behalf of a second subset of the plurality of agents. Step 704 includes providing a new agent to be provisioned into the plurality of agents. Step 706 includes initiating, via the new agent, a connection to the controller via the management network.

Step 708 includes receiving, by the new agent, from the controller and via the management network, reconfiguration instructions that indicate an allocated parent agent of the plurality of agents. Step 710 includes provisioning the new agent in accordance with the reconfiguration instructions, wherein the provisioning includes connecting the new agent to the allocated parent agent of the plurality of agents via the management network and disconnecting the new agent from the controller.

In various examples, the controller communicates directly via the management network with the first subset of the plurality of agents, wherein the controller communicates indirectly via the management network with the second subset of the plurality of agents, and wherein the controller communicates indirectly via the management network with the second subset of the plurality of agents via ones of the first subset of the plurality of agents.

In various examples, at least one of the plurality of agents is configured to communicate directly with another agent of the plurality of agents to perform a coordinated distributed processing. The coordinated distributed processing can include a map-reduce function to produce aggregated data and wherein the at least one of the plurality of agents communicates the aggregated data to the controller.

In various examples, at least one of the plurality of agents is configured to perform a plurality of functions autonomously from the controller, wherein the plurality of functions include two or more of: initiating a connection to an upstream agent of the plurality of agents in the hierarchical topology, pulling state information from the upstream agent of the plurality of agents, attempting a reconnection with another agent of the plurality of agents, or auto-healing degraded portions of the management network under jurisdiction of the at least one of the plurality of agents.

In various examples, at least one of the plurality of agents are configured to perform a plurality of functions autonomously from the controller, wherein the plurality of functions include two or more of: initiating a connection to an upstream agent of the plurality of agents in the hierarchical topology, receiving tasks to be performed from the upstream agent of the plurality of agents, or receiving a notification that a state of the management network has changed.

In various examples, the controller determines the allocated parent agent for the new agent based on at least one of: a geographical proximity to the new agent the allocated parent agent or based on a latency triangulation between the new agent and the allocated parent agent.

In various examples, when a child agent of the second subset of agents is disconnected from its designed parent agent included in the first subset of agents, the child agent is configured to:

retry connection with its designated parent agent for a configurable amount of time; and when child agent fails to connect with its designated parent agent during the configurable amount of time, the child agent attempts reconnection with the controller.

It is noted that terminologies as may be used herein such as data, bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A system for use with a geographically distributed data center having a plurality of managed equipment, the system comprising:
    a plurality of agents configured to control the managed equipment of the geographically distributed data center; and
    a controller configured to communicate management data with the plurality of agents via a management network, wherein the controller and the plurality of agents are configured in a hierarchical topology, and wherein a first subset of the plurality of agents are configured to relay management data on behalf of a second subset of agents of the plurality of agents, and wherein the controller is further configured to:
    communicate, via the management network, with a new agent to be provisioned into the plurality of agents;
    generate reconfiguration instructions that indicate an allocated parent agent of the plurality of agents to be associated with the new agent; and
    facilitate a provisioning the new agent in accordance with the reconfiguration instructions, wherein the facilitating the provisioning includes connecting the new agent to the allocated parent agent of the plurality of agents via the management network and disconnecting the new agent from the controller;
    wherein, when a child agent of the second subset of agents is disconnected from its designed parent agent included in the first subset of agents, the child agent is configured to:
    retry connection with its designated parent agent for a configurable amount of time; and
    when child agent fails to connect with its designated parent agent during the configurable amount of time, the child agent attempts reconnection with the controller.

2. The system of claim 1, wherein the controller communicates directly via the management network with the first subset of the plurality of agents.

3. The system of claim 2, wherein the controller communicates indirectly via the management network with the second subset of the plurality of agents.

4. The system of claim 3, wherein the controller communicates indirectly via the management network with the second subset of the plurality of agents via ones of the first subset of the plurality of agents.

5. The system of claim 1, wherein at least one of the plurality of agents is configured to communicate directly with another agent of the plurality of agents to perform a coordinated distributed processing.

6. The system of claim 5, wherein the coordinated distributed processing includes a map-reduce function to produce aggregated data and wherein the at least one of the plurality of agents communicates the aggregated data to the controller.

7. The system of claim 1, wherein at least one of the plurality of agents is configured to perform a plurality of functions autonomously from the controller, wherein the plurality of functions include two or more of: initiating a connection to an upstream agent of the plurality of agents in the hierarchical topology, pulling state information from the upstream agent of the plurality of agents, attempting a reconnection with another agent of the plurality of agents, or auto-healing degraded portions of the management network under jurisdiction of the at least one of the plurality of agents.

8. The system of claim 1, wherein at least one of the plurality of agents is configured to perform a plurality of functions autonomously from the controller, wherein the plurality of functions include two or more of: initiating a connection to an upstream agent of the plurality of agents in the hierarchical topology, receiving tasks to be performed from the upstream agent of the plurality of agents, or receiving a notification that a state of the management network has changed.

9. The system of claim 1, wherein the controller determines the allocated parent agent for the new agent based on at least one of: a geographical proximity to the new agent the allocated parent agent or based on a latency triangulation between the new agent and the allocated parent agent.

10. A method for use in a geographically distributed data center having a plurality of managed equipment, the method comprising:

provide a controller and a plurality of agents that communicate management data via a management network, wherein the plurality of agents control the managed equipment of the geographically distributed data center; wherein the controller and the plurality of agents are configured in a hierarchical topology, and wherein a first subset of the plurality of agents are configured to relay management data on behalf of a second subset of the plurality of agents;

providing a new agent to be provisioned into the plurality of agents;

initiating, via the new agent, a connection to the controller via the management network;

receiving, by the new agent, from the controller and via the management network, reconfiguration instructions that indicate an allocated parent agent of the plurality of agents; and provisioning the new agent in accordance with the reconfiguration instructions, wherein the provisioning includes connecting the new agent to the allocated parent agent of the plurality of agents via the management network and disconnecting the new agent from the controller;

wherein, when a child agent of the second subset of agents is disconnected from its designed parent agent included in the first subset of agents, the child agent is configured to:

retry connection with its designated parent agent for a configurable amount of time; and when child agent fails to connect with its designated parent agent during the configurable amount of time, the child agent attempts reconnection with the controller.

11. The method of claim 10, wherein the controller communicates directly via the management network with the first subset of the plurality of agents.

12. The method of claim 11, wherein the controller communicates indirectly via the management network with the second subset of the plurality of agents.

13. The method of claim 12, wherein the controller communicates indirectly via the management network with the second subset of the plurality of agents via ones of the first subset of the plurality of agents.

14. The method of claim 10, wherein at least one of the plurality of agents is configured to communicate directly with another agent of the plurality of agents to perform a coordinated distributed processing.

15. The method of claim 14, wherein the coordinated distributed processing includes a map-reduce function to produce aggregated data and wherein the at least one of the plurality of agents communicates the aggregated data to the controller.

16. The method of claim 10, wherein at least one of the plurality of agents is configured to perform a plurality of functions autonomously from the controller, wherein the plurality of functions include two or more of: initiating a connection to an upstream agent of the plurality of agents in the hierarchical topology, pulling state information from the upstream agent of the plurality of agents, attempting a reconnection with another agent of the plurality of agents, or auto-healing degraded portions of the management network under jurisdiction of the at least one of the plurality of agents.

17. The method of claim 10, wherein at least one of the plurality of agents is configured to perform a plurality of functions autonomously from the controller, wherein the plurality of functions include two or more of: initiating a connection to an upstream agent of the plurality of agents in the hierarchical topology, receiving tasks to be performed from the upstream agent of the plurality of agents, or receiving a notification that a state of the management network has changed.

18. The method of claim 10, wherein the controller determines the allocated parent agent for the new agent based on at least one of: a geographical proximity to the new agent the allocated parent agent or based on a latency triangulation between the new agent and the allocated parent agent.

* * * * *